May 17, 1955   W. O. BACKMAN ET AL   2,708,563
HERMETICALLY SEALED PACKINGLESS IN-LINE VALVE
Filed Oct. 8, 1954   3 Sheets-Sheet 1
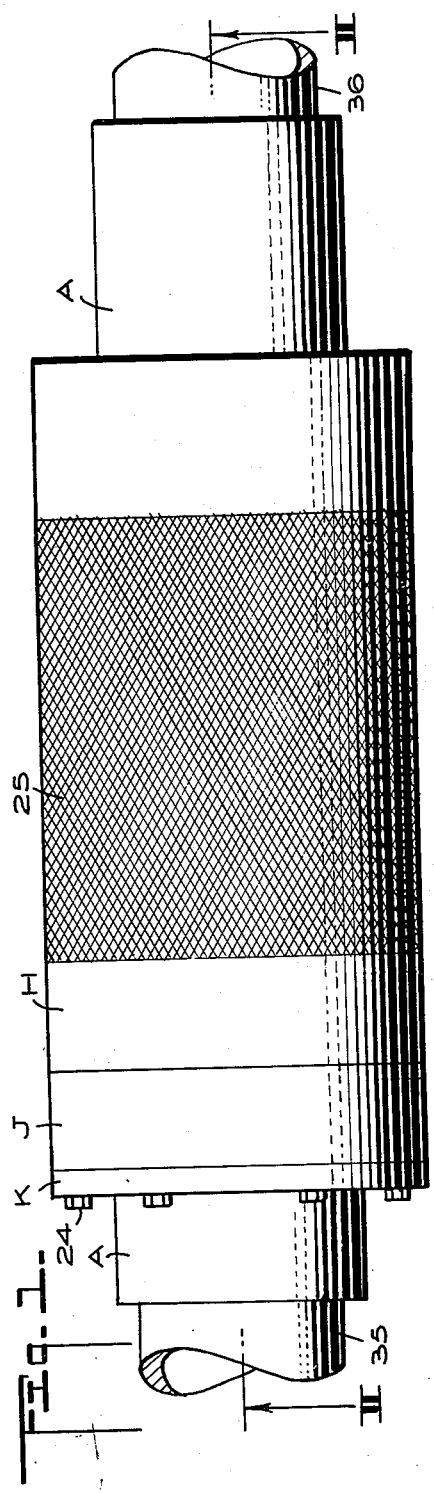
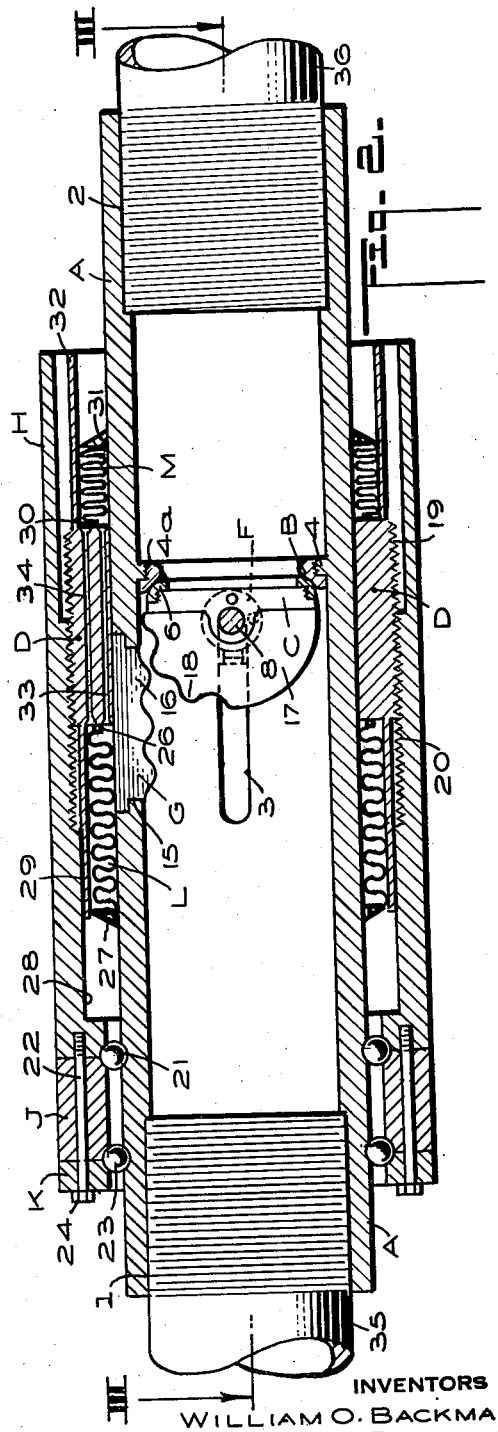
INVENTORS
WILLIAM O. BACKMAN
DON M. REDMON
BY
Munn & Liddy
ATTORNEYS

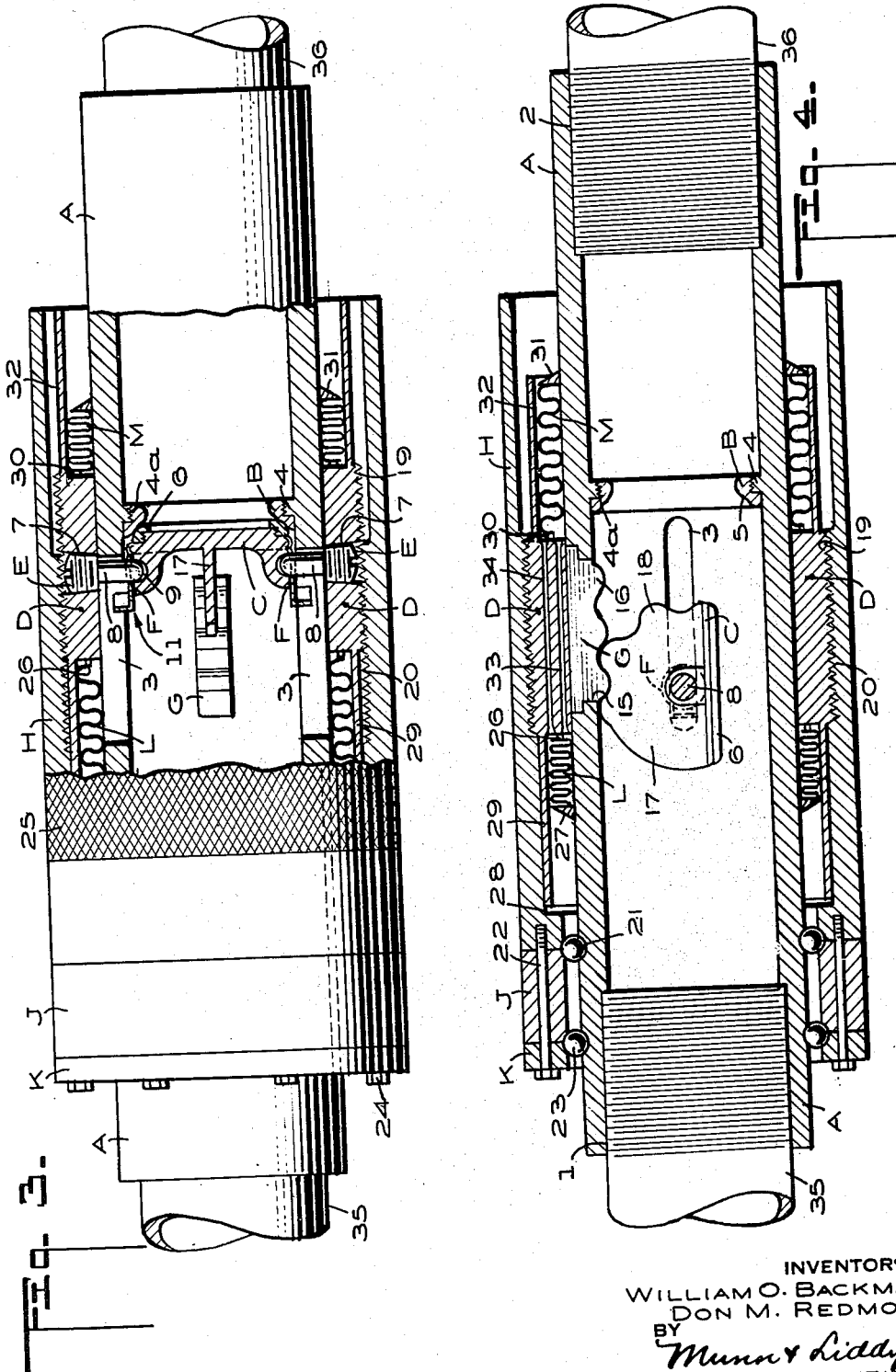
May 17, 1955   W. O. BACKMAN ET AL   2,708,563
HERMETICALLY SEALED PACKINGLESS IN-LINE VALVE
Filed Oct. 8, 1954   3 Sheets-Sheet 2
INVENTORS
WILLIAM O. BACKMAN
DON M. REDMON
BY
Munn & Liddy
ATTORNEYS

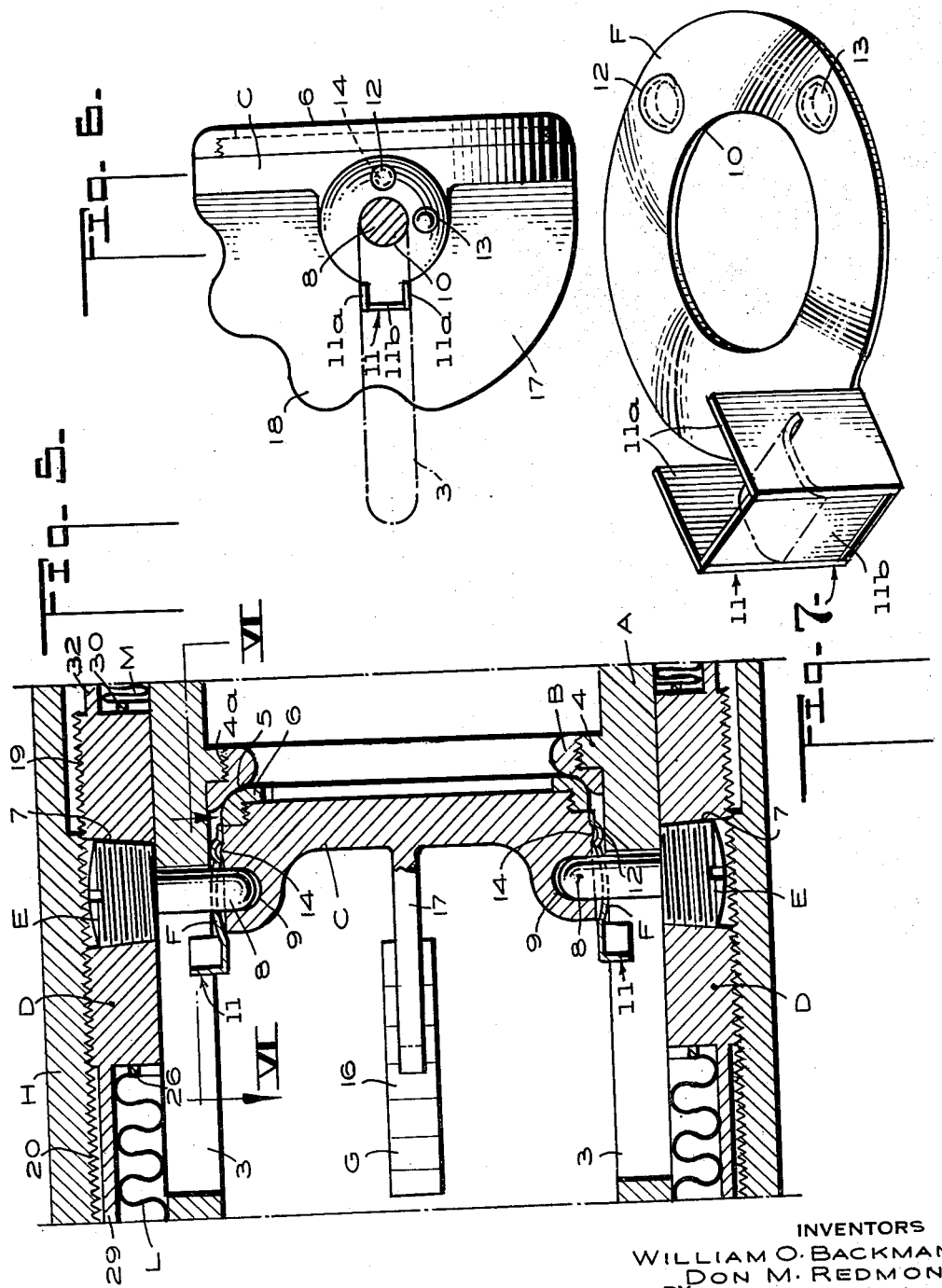

United States Patent Office 2,708,563
Patented May 17, 1955

2,708,563

HERMETICALLY SEALED PACKINGLESS IN-LINE VALVE

William O. Backman, Fair Oaks, and Don M. Redmon, San Francisco, Calif.

Application October 8, 1954, Serial No. 461,182

11 Claims. (Cl. 251—215)

An object of our invention is to provide an improvement over the in-line valve disclosed in our Patent No. 2,665,873, issued January 12, 1954. In the patent we show an in-line valve in which the valve casing is substantially of the same diameter as the pipe or conduit to which it is connected. All of the working parts of the valve are concealed within the valve casing and we obviate the necessity of causing any pivot pin for the working parts to extend through the valve casing to an exterior point thereof. This does away with the necessity of providing any packing or bearing for such pin and therefore there is no opportunity for the valve to leak through such a bearing or packing.

By mounting all of the working parts within the valve casing, we eliminate external handles, valve stems, packing arrangements, etc. An economy in space is effected. This is obviously an important factor in plumbing installations in locations such as submarines, chemical and industrial plants, etc.

In the present form of the invention, the butterfly type of valve body is pivoted directly to a sliding sleeve that encircles the cylindrical valve housing. The pivotal supports for the valve body have portions slidably received in longitudinally extending grooves provided in the valve housing. Novel means is provided for temporarily holding the butterfly valve body from rotating into open position until the valve body has been removed from the valve seat a predetermined distance.

A further object of the invention is to provide a device of the type described that does away with the usual packing rings and in the place thereof, makes use of bellows packing that will give a hermetic seal to the valve. This especially adapts the valve for handling material that might be harmful should the valve leak. The sliding sleeve is operatively connected to a rotatable sleeve and it is possible to operate the rotatable sleeve by remote control should the valve be used in atomic energy plants or other places where control of the valve from a distance becomes necessary or advisable.

Other objects and advantages will appear in the following specification, and the novel features of the device will be particularly pointed out in the appended claims.

Our invention is illustrated in the accompanying drawings forming a part of this application, in which:

Figure 1 is a side elevation of the in-line valve;

Figure 2 is a longitudinal section taken along the line II—II of Figure 1, and illustrates the butterfly type of valve;

Figure 3 is a section taken along the line III—III of Figure 2, portions of the in-line valve being shown in elevation;

Figure 4 is a sectional view similar to Figure 2, but shows the butterfly valve body in open position;

Figure 5 is an enlarged sectional view of the mid portion of the valve shown in Figure 2;

Figure 6 is a top plan view of the dish-shaped washer with integral tongue and shows its relation to the valve body when looking in the direction of the arrows VI—VI of Figure 5; and Figure 7 is a perspective view of the dish-shaped washer that functions to prevent the accidental swinging of the butterfly valve body until the valve body is positively moved by the rack and quadrant.

In carrying out our invention, we provide a cylindrical valve housing indicated generally at A in Figure 2. This housing is internally threaded at its ends 1 and 2. The housing has two diametrically opposed and longitudinally extending slots 3, and an inwardly extending annular rib 4, see Figure 3. An enlarged view of the rib is shown in Figure 5, and the rib is threaded at 4a for removably receiving a valve seat B. The valve seat has a double curved surface 5 for receiving a valve facing 6 of a butterfly valve body C. It will be noted that the replaceable valve facing 6 has a curved portion on its periphery that is adapted to rest against the curved portion of the valve seat B when the valve body is closed.

We provide novel means for pivotally and slidably supporting the butterfly valve body within the cylindrical housing A. An intermediate sleeve D is slidably mounted on the housing and it has a portion enclosing the slots 3. Tapered plugs E are threaded into tapered and threaded openings 7 provided at diametrically opposite points in the intermediate sleeve D. These plugs have inwardly extending and axially aligned pins that are integral with the plugs and are slidably received in the slots 3.

Figure 5 shows the butterfly valve body C provided with outwardly facing bores 9 that rotatably receive the inner ends of the pins 8. The ends of the pins do not extend to the bottom of the bores and therefore there can be no binding action between the pins and the butterfly valve body C. The tapered plugs E are self-sealing when they are threaded into the tapered openings 7. If desired, a sealing material can be used for the plugs. The pins 8 are free to move along the slots 3 when the intermediate sleeve is moved longitudinally along the housing. It will be seen that when the sleeve D is moved with respect to the housing, the pins 8 will remove the valve body C from the valve seat B. Presently we will describe how the valve body is positively swung into open position.

However it is best to described first how the valve body is held against rotation during the initial opening movement of the sleeve D, from the closed position of the valve illustrated in Figure 2. Two dish-shaped spring washers F of the type illustrated in Figure 7 are mounted on the pins 8. These washers have central openings 10 through which the pins 8 extend. The washers also have channel-shaped tongues 11 that are slidably received in the slots 3 and are for the purpose of preventing the washers from rotating about the pins 8. The tongue 11 is formed from side leaves 11a that are bent upwardly and from an end leaf 11b, which is also bent upwardly in Figure 7.

Again referring to Figures 6 and 7, the dish-shaped washers F are shown provided with spaced dimples or recesses 12 and 13 disposed on the faces of the washers that are positioned adjacent to the periphery of the butterfly valve C. The two recesses are spaced 90° apart and when the valve body is closed, the recess 12 will register with a mating nib or projection 14, provided on the valve body C and adjacent to the bore 9, see Figure 5. It will be seen that as the sleeve D and pins 8 initially move the valve body C away from the valve seat B, the channel tongues of the washers F will ride in the slots 3 and prevent the washers from rotating. The washers in turn will yieldingly bear against the valve body periphery and the nibs 14 of the valve body will be received in the dimples 12 in the washer. Therefore the valve body C will be held from rotating while it is moved away from the valve seat.

We provide means for positively swinging the valve body C into open position after the body has cleared the seat during the initial opening movement. This means comprises a rack bar G of the shape shown in Figure 4. The rack bar is inserted through a slot 15 in the housing A and may be silver soldered in place or held by any suitable fastening means. The slot may have shoulder portions at its ends and the rack bar may be provided with projections on its ends that rest on the shoulders. This construction permits the rack bar to be inserted into the slot 15 from the outer surface of the housing and the bar cannot drop into the interior of the housing. The rack bar has teeth 16 that extend into the interior of the housing a slight distance. The rack bar is disposed midway between the slots 3.

It will also be noted from Figures 4 and 6 that the butterfly valve C has an integral half-disc 17 extending at right angles to the plane of the valve body. The periphery of the half-disc has about 90° of its edge provided with teeth 18 that are adapted to mesh with the teeth 16. As the sleeve D and pins 8 carry the valve body C away from the valve seat B, during the opening of the valve, the teeth 18 on the quadrant gear will be brought into mesh with the rack teeth 16 and further movement will rotate the half-disc 17 and swing the butterfly valve into open position as shown in Figure 4.

The intermediate sliding sleeve D moves longitudinally along the housing A and is limited in its movement by the pins 8 riding in the slots 3. The closed position of the sleeve D and valve body C is shown in Figure 2, while the open position is shown in Figure 4. The sleeve D is exteriorly threaded at 19 and these threads mesh with internal threads 20 on an outer rotatable sleeve H. Any means may be used for permitting rotative movement of the outer sleeve H, while preventing its longitudinal movement along the housing A.

One such means is illustrated in Figures 2 and 4. A ball race 21 is placed at the left hand end of the sleeve 40 and it not only permits rotation of the sleeve, but it also prevents movement of the sleeve to the left. Studs 22 are carried by the left hand end of the sleeve and extend parallel with the sleeve H and the housing A axis. A spacing ring J has openings for receiving the studs 22 and this ring cooperates with the left hand end of the sleeve H, to receive a portion of the ball race 21.

A second ball race 23 bears against the left hand end of the ring J and is carried by the valve housing A so as to prevent movement of the spacing ring J to the left in Figure 2. An end ring K has openings for receiving the studs 22 and this ring cooperates with the spacing ring J for receiving the outer portion of the ball race 23. Nuts 24 are threaded upon the studs 22 and secure the end ring to the spacing ring. We have illustrated and described one means for rotatably supporting the outer sleeve H while preventing it from moving longitudinally along the housing A. The two ball races 21 and 23 give sufficient bearing support to the outer sleeve. Figure 1 shows the outer sleeve H, knurled at 25 for making it easy to rotate the sleeve.

We hermetically seal the intermediate sleeve D at each end by means of bellows indicated generally at L and M, see Figures 2 and 4. The bellows L is disposed at the left hand end of the sleeve D and it has its right hand end welded or otherwise sealed to the sleeve at 26. The left hand end of the bellows L is sealed to the outer surface of the housing A by a buttress 27 and this buttress reinforces the end fold of the bellows. The bellows L is shown expanded in Figure 2 when the valve is closed.

The outer rotatable sleeve H is provided with an annular recess 28 for receiving the sleeve D and the sealing bellows L. The left hand end of the sleeve D has an annular shield 29 that is integral therewith and extends over the bellows L so as to enclose it. The shield prevents the bellows from contacting with the exposed portions of the threads 20, when the valve is closed and also from contacting with the inner cylindrical wall of the recess 28.

The right hand sealing bellows M has its left hand end welded or otherwise sealed to the sleeve D at 30. The right hand end of the bellows M is sealed to the outer surface of the housing A by a buttress 31 which reinforces the end fold of the bellows. The bellows M is shown collapsed in Figure 2 when the valve is closed. The annular recess 28 in the outer sleeve H receives the sleeve D and bellows M. The right hand end of the sleeve D has an annular shield 32 that is integral therewith and extends over the bellows M so as to enclose it. This shield prevents the bellows M from contacting with the inner cylindrical wall of the annular recess 28.

It will be noted from Figure 2, that the intermediate sleeve D has an equalizing bleed passage 33 extending longitudinally therethrough from end to end and communicating with the interior spaces of the bellows L and M, lying within the annular seals 26 and 30 where the inner ends of the bellows are sealed to the ends of the sleeve. The passage 33 permits any trapped air or gas in the bellows L to move into the interior of the bellows M, as the valve body C is moved from closed to open position. Also the passage 33 permits both bellows L and M to be placed under the same pressure when a portion of the fluid or gas in the housing A, passes through the slots 3 and into the interior of the bellows.

Figure 2 further shows a second or outer bleed passage 34 extending longitudinally through the intermediate sleeve D and communicating with the interior of the shields 29 and 32, but at points outside of the seals 26 and 30 that connect the inner ends of the bellows L and M to the sleeve. Any variation in pressure of the air that surrounds the two bellows L and M will be automatically compensated for.

From the foregoing description of the various parts of the device, the operation thereof may be readily understood. In assembling the valve parts, the valve body C is seated and then the intermediate sleeve D is moved to permit the tapered plugs E with their pins 8 to be inserted in the slots 3 and the bores 9 as well as the pins being received in the openings 10 in the spring washers F. The sealing bellows L and M have already been sealed to the ends of the sleeve D and then the outer ends of these bellows are also sealed to the housing A at the appropriate places to permit longitudinal movement of the sleeve D.

The outer sleeve H is now threaded onto the intermediate sleeve D until it is brought into proper position, whereupon the ball races 21 and 23 as well as the rings J and K are connected in place. The outer sleeve can now rotate, but is prevented from moving longitudinally with respect to the valve housing A. The valve housing may receive the ends of pipes 35 and 36, the pipe 35 being received by the threads 1 and the pipe 36 being received by the threads 2.

The valve is shown closed in Figure 2. To open the valve, the outer sleeve H is rotated and this will move the intermediate sleeve D for advancing the pins 8 along the slot 3. The spring washers F will hold the valve body C from rotating until the teeth 18 start meshing with the rack bar teeth 16. The tongues 11 of the washers F will ride in the slots 3 and prevent the washers from rotating. The nibs 14 are received in the dimples 12 of the washers F and therefore there can be no swinging of the valve body C until there is actual meshing of the quadrant gear teeth 18 with the teeth 16. The washers F constitute yielding means carried by the valve body and pins for holding the valve body from accidental swinging.

When this meshing occurs between the gear teeth and rack, the valve body C will be rotated and the nibs 14 will ride out of the dimples 12 in the washers. The valve may be opened part way or all of the way. When the valve is fully opened, the nibs 14 will be received by the dimples 13 in the washers F. The valve seat B and the valve facing 6 have their surfaces curved so as to offer practically no obstruction to the flow of material through the valve when the valve is opened. The bellows L and M provide a packingless and hermetic seal for the interior of the valve housing. The bleed passages 33 and 34 equalize any interior pressures that might build up in the bellows L and M, and any exterior pressures that might build up at opposite ends of the recess 28 in the sleeve H.

The annular shields 29 and 32 protect the sealing bellows whether in collapsed or extended positions. The half-disc 17 acts as a reinforcing member for the valve body C as well as having the teeth 18 formed on a portion of its periphery, constituting a quadrant gear. The peripheries of the valve body C and valve facing 6 are made small enough for the valve body to clear the inner surface of the housing A when the valve body pivots about its axis.

No special tools are necessary to assemble or disassemble the valve parts. The valve has many uses. It can be operated where space is limited. The valve can be used where it is necessary to hermetically seal the parts and at the same time provide a packingless valve.

In Figure 7 we show the end leaf 11b extending between the side leaves 11a so as to support them from moving toward each other. If desired, the end leaf may be curved inwardly as shown by the dot-dash line to give greater support throughout the width of the side leaves 11a.

We claim:

1. In a hermetically sealed packingless in-line valve: a cylindrical valve housing having a rack in its wall with the teeth facing inwardly and lying in a line that parallels the longitudinal axis of the housing; said housing having an annular valve seat spaced from the rack; an intermediate sleeve slidable along the housing; inwardly extending pins carried by the sleeve; said housing having slots for slidably receiving the pins; a butterfly valve body pivotally carried by the pins and adapted to bear against the valve seat when the valve is closed; a quadrant gear integral with the valve body and placed in line with the rack so that when the sleeve moves the pins for moving the quadrant gear toward the rack, the butterfly valve body will be moved clear of the valve seat prior to the quadrant meshing with the rack; means hermetically sealing the ends of the sleeve to the housing while permitting longitudinal movement of the sleeve within predetermined limits; and means for moving the sleeve for causing the valve body to be moved away from the valve seat; further movement of the means causing the quadrant to mesh with the rack and rotate the valve body about the moving pins into open position.

2. The combination as set forth in claim 1: and in which yielding means is carried by the valve body and pins and has a portion slidable in the slots for holding the valve body against free swinging movement about the pins until the quadrant meshes with the rack.

3. The combination as set forth in claim 1: and in which said hermetic sealing means comprises two bellows having their inner ends sealed to the sleeve ends and having their outer ends sealed to the housing at places to permit the sleeve to move for opening and closing the valve; and shields protecting the bellows.

4. In an in-line valve: a cylindrical valve housing having a rack in its wall with the teeth facing inwardly and lying in a line that parallels the longitudinal axis of the housing; said housing having an annular valve seat spaced from the rack; an intermediate sleeve slidable along the housing; inwardly extending pins carried by the sleeve; said housing having slots for slidably receiving the pins; a butterfly valve body pivotally carried by the pins and adapted to bear against the valve seat when the valve is closed; a quadrant gear integral with the valve body and placed in line with the rack so that when the sleeve moves the pins for moving the quadrant gear toward the rack, the butterfly valve body will be moved clear of the valve seat prior to the quadrant meshing with the rack; an outer rotatable sleeve threaded upon the intermediate sleeve; means for rotatably connecting the outer sleeve to the housing while preventing it from moving longitudinally; whereby a rotation of the outer sleeve will move the inner sleeve along the housing for opening or closing the valve.

5. The combination as set forth in claim 4: and in which dish-shaped spring washers are mounted on the pins and bear against the valve body periphery; nibs carried by the valve body periphery; said washers having dimples for receiving the nibs when the valve body is closed; said washers having tongues slidable in the slots for preventing rotation of the washers; and said washers having additional dimples for receiving the nibs when the valve body is moved from closed to open position.

6. In a device of the type described: a cylindrical housing for a valve and having a valve seat therein; a butterfly valve body adapted to bear against the seat when the valve is closed; said housing having a pair of diametrically opposed slots; an intermediate sleeve slidable longitudinally over the housing and covering the slots; a pair of pins carried by the sleeve and extending inwardly through the slots; said butterfly valve body being carried by and pivoted to the pins; cooperating means carried by the valve body and by the housing for opening the valve body when the sleeve is moved in one direction and for causing the valve body to bear against the seat when the sleeve is moved in the opposite direction; an outer sleeve rotatable on the intermediate sleeve and on the housing; said outer sleeve being held against longitudinal movement with respect to the housing and having a recess extending part way therethrough for receiving the intermediate sleeve; a sealing bellows disposed in the recess and having one end sealed to the end of the intermediate sleeve that faces into the recess, and having its other end sealed to the housing so as to enclose the slots.

7. The device as set forth in claim 6: and in which a cylindrical shield is carried by the intermediate sleeve and encloses the bellows in all of its positions.

8. The device as set forth in claim 7: and in which a second sealing bellows is disposed in the recess and has one end sealed to the opposite end of the intermediate sleeve from the first bellows, and has its other end sealed to the housing at a point to permit movement of the intermediate sleeve along the housing.

9. The device as set forth in claim 8: and in which a second cylindrical shield is carried by the intermediate sleeve at the opposite end from the first shield; said second shield enclosing the second bellows in all of its positions.

10. The device as set forth in claim 9: and in which the intermediate sleeve has an equalizing bleed passage extending therethrough and communicating with the interiors of the two bellows.

11. The device as set forth in claim 10: and in which the intermediate sleeve has a second equalizing bleed passage extending therethrough and communicating with the recess in the outer sleeve at points outside of the two bellows.

No references cited